United States Patent [19]

Fukuda et al.

[11] 3,998,596
[45] Dec. 21, 1976

[54] APPARATUS FOR TREATING BY-PRODUCT GYPSUM TO BE USED AS AN INHIBITOR FOR SETTING OF CEMENT

[75] Inventors: Yoshiharu Fukuda, Tokyo; Toshio Onishi, Koshigaya; Akitoshi Takeuchi, Yokohama, all of Japan

[73] Assignee: Onoda Cement Company, Japan

[22] Filed: Aug. 8, 1975

[21] Appl. No.: 602,927

Related U.S. Application Data

[62] Division of Ser. No. 366,402, June 4, 1973, Pat. No. 3,928,053.

[52] U.S. Cl. .............................. 23/262; 23/287; 34/57 A; 432/58
[51] Int. Cl.² ............... B01J 1/00; C04B 11/02
[58] Field of Search ........... 23/262, 287; 432/15, 432/58; 34/10, 57 A; 106/109, 110

[56] References Cited
UNITED STATES PATENTS

| | | | |
|---|---|---|---|
| 2,621,034 | 12/1952 | Stecker | 432/58 |
| 3,047,447 | 7/1962 | Stasse | 106/109 |
| 3,159,497 | 12/1964 | Onoda | 106/109 X |
| 3,199,997 | 8/1965 | Johnson | 106/109 X |
| 3,445,323 | 5/1969 | Schnabel | 106/109 X |
| 3,489,583 | 1/1970 | Bloom et al. | 106/109 X |
| 3,827,897 | 8/1974 | Dumont | 106/110 |
| 3,839,802 | 10/1974 | Saito et al. | 34/10 |
| 3,945,841 | 3/1976 | Dumont | 106/109 |

Primary Examiner—Morris O. Wolk
Assistant Examiner—Arnold Turk
Attorney, Agent, or Firm—Mallinckrodt & Mallinckrodt

[57] ABSTRACT

Apparatus comprising means for dispersing comminuted limestone in a stream of hot gas and calcining it to form quicklime; a calcining chamber into which comminuted gypsum and the stream of hot gas containing the quicklime are introduced wherein the gypsum is calcined and thoroughly mixed with the quicklime; a gas-solids separator for separating the calcined gypsum and quicklime from the gas stream; and hydration means for hydrating the quicklime and gypsum whereby any phosphoric acid in the gypsum reacts with the hydrated quicklime to form insoluble calcium phosphate.

3 Claims, 2 Drawing Figures

APPARATUS FOR TREATING BY-PRODUCT GYPSUM TO BE USED AS AN INHIBITOR FOR SETTING OF CEMENT

The present application is a division of copending application Ser. No. 366,402 filed June 4, 1973, and now Pat. No. 3,928,053.

This invention relates to apparatus for treating gypsum containing phosphoric acid contaminants, such as by-product gypsum obtained in the production of phosphoric acid, to produce gypsum which is suitable for use as an inhibitor for the setting of Portland cement.

As an inhibitor for the setting of Portland cement (hereinafter referred to as merely cement), a mixture of cement clinker and a small amount of dihydrated gypsum has been used for a long time. Heretofore, natural gypsum has preferably been used, and gypsum produced industrially, particularly by-product gypsum from the process of manufacturing phosphoric acid has not been used unless it has been refined to inactivate the residual phosphoric acid contaminant therein. Otherwise, the phosphoric acid contained in or attached to the gypsum crystals retards the setting of the cement and reduces the mechanical strength of cement.

In Japanese Pat. No. 249,125 (Patent Application Publication No. 5544/1958) and Japanese Pat. No. 488,975 (Patent Application Publication No. 3918/1963), a method is disclosed for treating by-product gypsum with an alkali substance, such as quicklime before or after the gypsum is calcined and the mixture is then subjected to hydration to form dihydride gypsum. During the hydration, the quicklime reacts with water to form calcium hydroxide, and any phosphoric acid contained in the gypsum reacts with the calcium hydroxide to form calcium phosphate. Calcium phosphate is almost insoluble in water, and it does not adversely affect the hydration or setting of cement as does phosphoric acid. The gypsum treated is effective as inhibitor for cement setting.

In the process for treating the by-product gypsum, the calcination thereof is generally carried out in the rotary kiln, with the alkali additive, generally quicklime, being added to the gypsum in the rotary kiln. Unfortunately, the quicklime reacts with water and is, therefore, difficult to handle and store. Also when quicklime is added to a gypsum material having a water content, the lime is instantly hydrated and coagulates. As a result, the lime is not uniformly dispersed in the gypsum mixture. If quicklime is added to calcined gypsum, a separate mixing step is required. Further, when gypsum is calcined, and as it becomes dry, it divides into a fine powder which does not readily flow through the rotary kiln. The fine powder accumulates and moves through the kiln in erratic, plug type flow which results in non-uniform calcination.

The object of the present invention is to calcine gypsum uniformly, to eliminate the problems heretofore experienced in handling and using quicklime, to mix calcined gypsum and quick lime uniformly in novel apparatus which avoids the problems inherent with the rotary kiln.

The present invention provides a method and apparatus for treating by-product gypsum, wherein limestone powder is dispersed in a stream of hot gas to convert it into quicklime. Thereafter, by-product gypsum, such as that from the manufacture of phosphoric acid from phosphate minerals, is dispersed in the hot gas stream containing the quicklime, and the gypsum is calcined to form monohydrate and anhydride gypsum which are thoroughly mixed with the quicklime in the gas stream. The calcined gypsum and quicklime are then separated from the gas stream and hydrated to form dihydride gypsum and calcium hydroxide respectively. The calcium hydroxide further reacts with any phosphoric acid contaminant in the gypsum to calcium phosphate. The apparatus of this invention comprises means for producing the stream of hot gas; means for dispersing limestone powder into the stream of hot gas and calcining the limestone to form quicklime; a calcining chamber; means for introducing powdered gypsum and the stream of hot gas containing quicklime into the calcining chamber wherein, the gypsum is calcined and thoroughly mixed with the quicklime; a gas-solids separator for separating the calcined gypsum and quicklime from the gas stream; and hydration means for hydrating the gypsum and quicklime to form dihydrated gypsum and calcium hydroxide and further reacting any phosphoric acid contained in the gypsum to calcium phosphate.

The present application will be more fully described with reference to the accompanying drawings in which.

Figure 1:
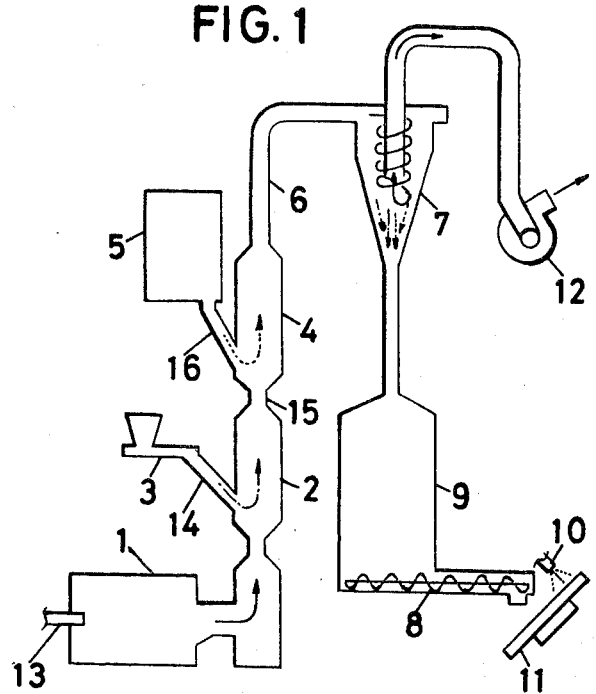
FIG. 1 is a diagrammatic side view of apparatus for carrying out the method of the present invention.

As illustrated in FIG. 1, a hot air furnace 1 is connected to one end of limestone calcining tube 2. A limestone feeder 3 is connected to calcining tube 2 at a point near the gas inlet end thereof by a feed pipe 14, and a gas outlet is positioned at the other end of the limestone calcining tube 2. The calcining tube 2 has a diameter larger than that of any of the feed or discharge outlets therein. The gas outlet of calcining tube 2 is connected to the inlet of a gypsum calcining tube 4 by a duct 15 extending therebetween. Calcining tube 4 has a larger diameter than that of the duct 15. A gypsum feeder 5 is connected to the gypsum calcining tube 4 by a supply tube 16. The gas outlet of gypsum calcining tube 4 is connected to the inlet of a cyclone 7 by a duct 6 through which the exit gases containing calcined lime and gypsum pass. The solids discharge opening of the cyclone 7 is connected to a calcining tank 9 which is provided with a drawer 8 at its bottom. The drawer 8 is connected to a pan type pelletizer 11 which is provided with a water spray nozzle 10. A gas tube in the center of the cyclone 7 is connected to a gas exhaust fan 12.

In the apparatus illustrated in FIG. 1, hot gas, produced in furnace 1, is fed directly to calcining tube 2. The limestone is introduced in the calcining tube 2 wherein it is dispersed in the hot gas and calcined into quicklime. The gas stream containing the dispersed quicklime is then introduced through duct 15 into the gypsum calcining tube 4. Gypsum powder is added to calcining tube 4 from the feeder 5 and dispersed in the hot gas stream. The gypsum is calcined to form monohydrated and/or soluble, anhydride gypsum, and the calcined gypsum is thoroughly mixed with the quicklime. Thereafter, gas and solid materials are separated in the cyclone 7, and the gas is exhausted from the exhaust fan 12. The mixture of quicklime and gypsum is introduced to tank 9.

Such calcined product is substantially a mixture of quicklime and monohydrated and/or soluble anhydride gypsum. The product is then drawn from the tank 9 to the drawer 8 and supplied to the pan type pelletizer 11.

Therein, the calcined product is subjected to hydration with water sprayed from the nozzle 10. Thus, the calcined product is granulated and the grade of gypsum is improved due to the conversion of any phosphoric acid contaminant therein to calcium phosphate.

The calcining tubes 2 and 4 are preferably of sufficient length so that the powder material introduced thereinto may be well dispersed in the stream of hot gas therein. By reducing the diameter of the gas inlet of the tubes to a shape of a throttle, hot gas is introduced to the tubes at a high speed. As a result of the vortex produced by the high speed gas injection, the powder material being introduced into the respective tubes is dispersed and thoroughly mixed with the hot gas to bring forth better heat exchange between the powder and gas, whereby calcination of the material is obtained in a relatively short period of time.

In the apparatus shown in FIG. 1, the limestone powder is introduced into and calcined in calcining tube 2. However, the apparatus can be modified so that the limestone is fed directly into the hot gas furnace 1, or the limestone powder may be entrained in the air supplied to the gas burner for producing the stream of hot gas. With such modification, the calcining tube 2 may serve merely as a duct and may be shortened or totally dispensed with.

Figure 2:
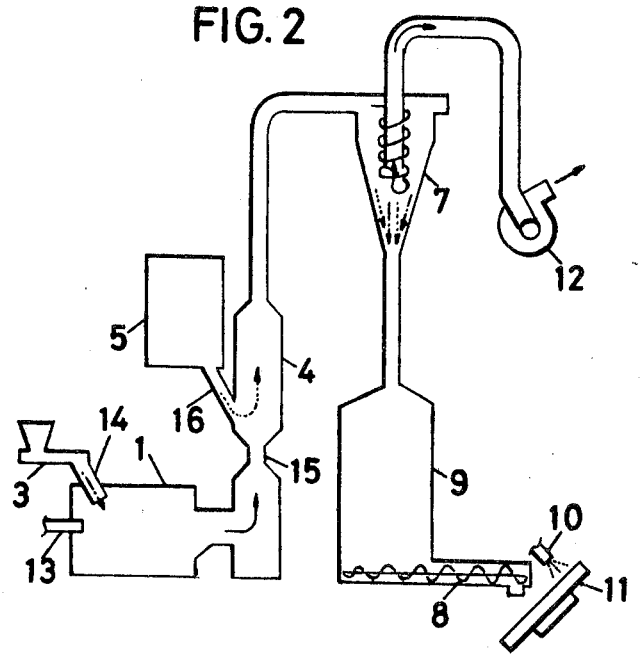
FIG. 2 is a diagrammatic side view of another embodiment of apparatus of the present invention.

In FIG. 2, there is shown a second embodiment of apparatus in which a hot gas producing furnace 1 is provided with a burner 13. Limestone is supplied to the furnace from a feeder 3 through supply pipe 14. The hot gas outlet of furnace is connected to a gypsum calcining tube 4 by duct 15.

The powdered limestone is thoroughly mixed with the hot gases produced by combustion of fuel in burner 13, and as a result, the limestone is calcined to quicklime. The stream of gas, containing the quicklime, is then passed through the duct 15 and fed into the gypsum calcining tube 4. The remainder of the apparatus shown in FIG. 2 is identical with corresponding equipment shown in FIG. 1 (with corresponding equipment being identified by the same reference numerals in the two FIGS.).

Also, instead of supplying limestone directly to the hot gas producing furnace, it is possible to disperse it with the combustion air which is fed to the furnace. In such instances, the same effect is obtained as in the apparatus shown in FIG. 2. In essence, any furnace or other apparatus for producing a stream of hot gas can be used if limestone can be introduced into the hot gas being produced to calcine the limestone.

In the method described above, the hot gas and powder to be treated flow concurrently through the respective calcining tubes 2 and 4. The powder material and hot gas contact each other as they pass through the calcining tubes. The powder material is gradually heated while the gas decreases in temperature and the two approach the same temperature. It is of particular advantage that the gypsum material is thus uniformly calcined without being overheated. Contrary to the nonuniform calcining obtained in a rotary kiln, the present invention provides for precise regulation of the calcining temperature which results in a uniformly calcined product.

Limestone theoretically begins to calcine at a temperature of about 700° C. However, in practice, the calcining temperature is higher, and in the conventional rotary kiln or vertical type of furnace, calcination of limestone is effected at a temperature of 1000° C or higher. In the present invention, limestone is supplied at a rate of only several per cent, i.e., only that which is sufficient to neutralize the soluble phosphoric acid ingredient contained in the gypsum which is to be treated. Thus, the thermal heat comsumption for calcining the limestone is comparatively low. The limestone is preferably treated at high temperature in the fast flowing hot gas and converted into quicklime in a relatively short time. The stream of hot gas should be converted to quicklime prior to passage of the stream of hot gas to the gypsum calcining tube. The length of calcining tubes 2 and 4, as well as duct 6, will depend on the temperature of the stream of hot gas and the particle size of the limestone and gypsum. Preferably, the temperature of hot gas is 1500° C or higher.

The invention is further described by reference to the following example which is given for purposes of illustration only and without any intention that the invention be limited thereto.

EXAMPLE

Tha apparatus used in this example was similar to that shown in FIG. 1. The hot gas was supplied from an oil burning furnace 1. The temperature of the gas stream at the inlet of limestone calcining tube 2 was 1370° C. Limestone, pulverized to a powder (particle size being such that 97% thereof will pass through a sieve of 88 microns mesh) is introduced into the calcining tube 2. The quantity of limestone fed to the tube 2 was about 3 – 4% by weight of the gypsum material to be treated. The temperature of gas passing from tube 2 to gypsum calcining tube 4 was 1200° C. Powdered gypsum contaminated with phosphoric acid and containing 20% water was fed to gypsum calcining tube 4. The temperature at the gas stream at the inlet of cyclone 7 was 200° C. The calcined solids were separated from the gas stream in the cyclone 7, and then were subjected to hydration with water in a pan type pelletizer 11. The solids were formed into 5–20 mm granules containing dihydrated gypsum, which were suitable for use as an additive to cement.

Conversion of limestone to CaO in tube 2 was about 95%. The calcined gypsum granules from the pelletizer 11 were analyzed by means of X-ray diffraction and chemical analysis. They were found to contain about 1% dihydrated gypsum, about 3% monohydrated gypsum, and the rest soluble, anhydrated gypsum.

The gypsum produced according to the above Example was added to a sample of cement as a setting inhibitor, and gypsum which had been calcined with quicklime in a conventional rotary kiln was added to another sample of cement. Both samples of cement were mixed with water and set. Tests of the physical strength of each sample were made and the results are shown in the following Table.

Table

| Method of calcining gypsum | Cao % Added to gypsum | Test of cement setting | | | Compression strength (Kg/cm$^2$) | | |
| --- | --- | --- | --- | --- | --- | --- | --- |
| | | Water % | Initial setting time | Final setting time | After 3 days | After 7 days | After 28 days |
| | | | hour  min. | hour  min. | | | |
| The present invention | 3.5 | 26.7 | 3   —03 | 4   —05 | 128 | 227 | 420 |
| Conventional examples | 3.5 | 26.8 | 5   —15 | 6   —28 | 115 | 215 | 380 |
| | 6.7 | 26.7 | 3   —22 | 4   —19 | 125 | 227 | 419 |

The results shown in the Table show that cement containing gypsum obtained by the present invention demonstrates normal setting and equal strength to cement containing gypsum which has been calcined with up to twice the amount of quicklime in a conventional rotary kiln.

What is claimed is:

1. Apparatus for treating gypsum which is contaminated with phosphoric acid contaminant so that said gypsum can be used as an additive in cement to inhibit the setting rate thereof, said apparatus comprising:
   a. means for dispersing comminuted limestone in a stream of gas, said gas having a temperature sufficient to calcine said limestone to quicklime;
   b. an elongate calcining chamber;
   c. means for continuously introducing said stream of hot gas containing said quicklime to one end of said calcining chamber;
   d. means for continuously introducing said gypsum in comminuted form to said one end of said calcining chamber and for dispersing said gypsum in said stream of hot gas to calcine said gypsum;
   e. means for continuously withdrawing a gaseous dispersion containing quicklime and calcined gypsum from the other end of said calcining chamber;
   f. a gas-solids separator for separating the calcined gypsum and quicklime from said dispersion; and
   g. means for hydrating the quicklime and gypsum.

2. Apparatus in accordance with claim 1, wherein said means for dispersing comminuted limestone in the stream of hot gas comprises a furnace for producing said stream of hot gas; an elongated chamber; means for introducing said stream of hot gas to one end of said chamber; means for introducing comminuted limestone to said one end of said chamber and for dispersing said limestone in said stream of hot gas to calcine said limestone to quicklime; and means for withdrawing said stream of hot gas containing quicklime dispersed therein from the other end of said chamber.

3. Apparatus in accordance with claim 1, wherein said means for dispersing comminuted limestone in the stream of hot gas comprises a combustion chamber having means for burning a fuel to produce hot combustion gases; and means for introducing comminuted limestone to said combustion chamber; and means for withdrawing said hot combustion gas containing said limestone from the combustion chamber.

* * * * *